(12) United States Patent
McManis

(10) Patent No.: US 6,546,487 B1
(45) Date of Patent: *Apr. 8, 2003

(54) SYSTEM AND METHOD FOR PROTECTING USE OF DYNAMICALLY LINKED EXECUTABLE MODULES

(75) Inventor: Charles E. McManis, Sunnyvale, CA (US)

(73) Assignee: Sun Microsystems, Inc., Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 47 days.

This patent is subject to a terminal disclaimer.

(21) Appl. No.: 09/420,946

(22) Filed: Oct. 19, 1999

Related U.S. Application Data

(63) Continuation of application No. 08/992,079, filed on Dec. 17, 1997, now Pat. No. 5,970,145, which is a continuation of application No. 08/547,720, filed on Oct. 26, 1995, now Pat. No. 5,757,914.

(51) Int. Cl.[7] ............................................. H04L 9/00
(52) U.S. Cl. ...................... 713/169; 713/200; 713/201; 713/202; 713/176; 713/187; 713/189
(58) Field of Search ................................ 713/200, 201, 713/202, 187, 189, 176, 169

(56) References Cited

U.S. PATENT DOCUMENTS 5,224,160 A  6/1993  Paulini et al. ................. 380/4

(List continued on next page.)

OTHER PUBLICATIONS

Schneier, Applied Cryptography 2e, pp. 34–35, Oct. 1995.*
Smith, The Scientist and Engineer's Guide to Digital Signal Processing, California Technical Pub, p. 616, 1997.*

(List continued on next page.)

*Primary Examiner*—Gail Hayes
*Assistant Examiner*—James Seal
(74) *Attorney, Agent, or Firm*—Gary S. Williams; Pennie & Edmonds LLP

(57) ABSTRACT

A computer system has a program module verifier and at least first and second program modules. Each program module includes a digital signature and an executable procedure. The first program module furthermore includes a procedure call to the second procedure module, a procedure call to the program module verifier that is logically positioned in the first program module so as to be executed prior to execution of the procedure call to the second program module, and instructions preventing execution of the procedure call to the second program module when the procedure call to the program module verifier results in a verification denial being returned by the program module verifier. The second program module includes an executable procedure to be performed in response to the procedure call by the first program module to the second program module, a procedure call to the program module verifier that is logically positioned in the second program module so as to be executed prior to completion of execution of the second program module's executable procedure, and instructions preventing completion of execution of that executable procedure when the program module verifier returns a verification denial with respect to the first program module. The program module verifier responds to procedure calls by verifying the authenticity of any specified program module and by returning a verification confirmation or denial. When the program module verifier fails to verify the authenticity of a program module, the calling program module throws an exception and aborts its execution.

19 Claims, 4 Drawing Sheets

U.S. PATENT DOCUMENTS

| | | | | |
|---|---|---|---|---|
| 5,339,403 A | * | 8/1994 | Parker | 395/425 |
| 5,343,527 A | | 8/1994 | Moore | 380/4 |
| 5,349,642 A | | 9/1994 | Kingdon | 380/25 |
| 5,421,006 A | | 5/1995 | Jablon et al. | 395/575 |
| 5,737,523 A | | 4/1998 | Callaghan et al. | 395/187.01 |
| 5,742,759 A | | 4/1998 | Nessett et al. | 395/187.01 |
| 5,748,739 A | | 5/1998 | Press | 380/25 |
| 5,757,914 A | | 5/1998 | McManis | 380/23 |
| 5,970,145 A | | 10/1999 | McManis | 380/23 |

OTHER PUBLICATIONS

Goodyear, Signal and Information, Wiley, p. 1, 1971.*

Bell, Information Theory and its Engineering Applications, Pitman, p. 53, 1962.*

Terman, Electronic and Radio Engineering McGraw–Hill 4e, p. 7, Oct. 95.*

Gustavus Simmons, Contemporary Cryptology, The Science of Information Integrity, IEEE, 1992, pp. 181–201.*

Gosling J. et al. "The Java Language Environment," *A White Paper*, p. 1,4–85.

* cited by examiner

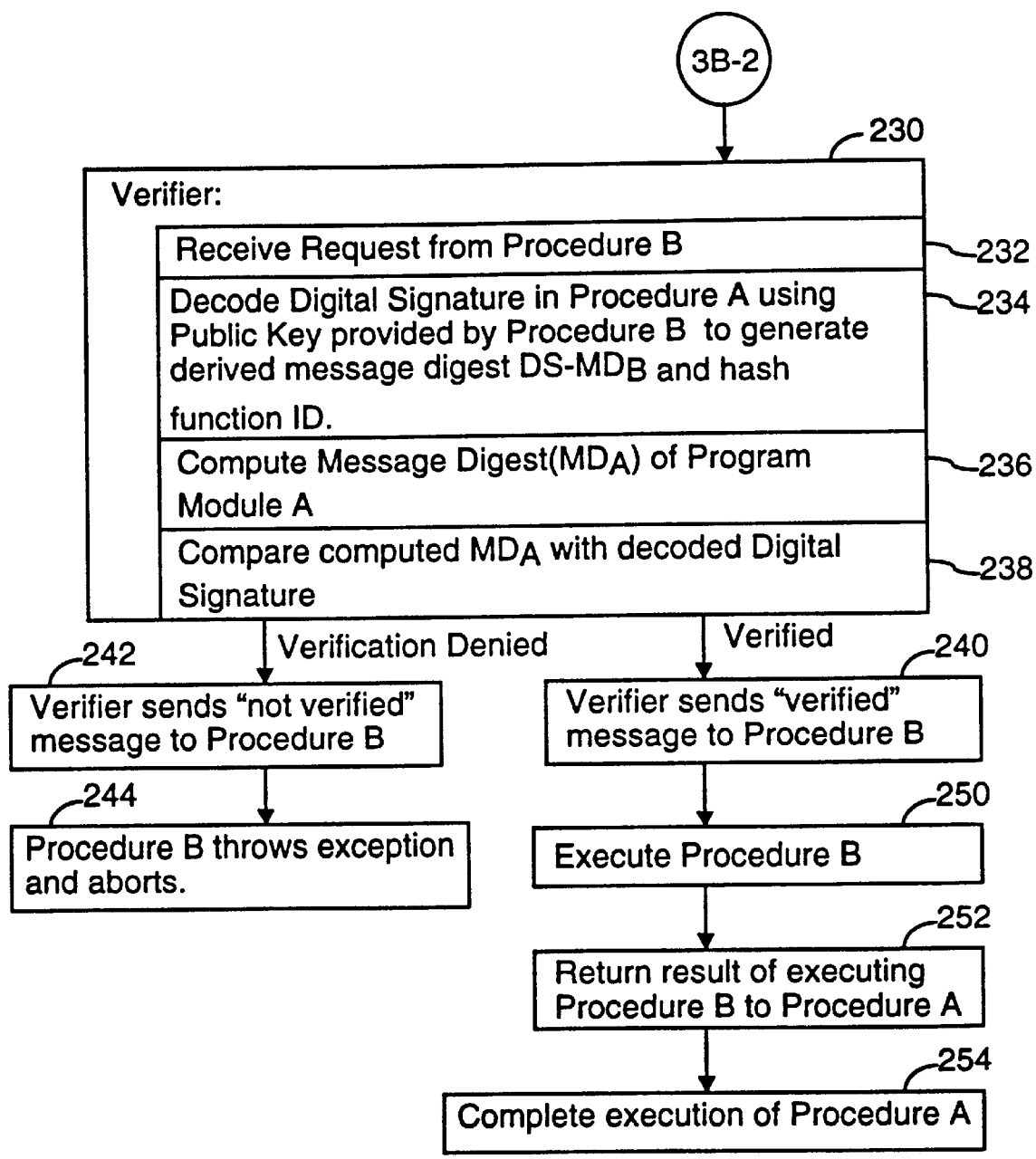

SYSTEM AND METHOD FOR PROTECTING USE OF DYNAMICALLY LINKED EXECUTABLE MODULES

This application is a continuation of U.S. application Ser. No. 08/992,079 filed Dec. 17, 1997 and issued as U.S. Pat. No. 5,970,145 which is a continuation of U.S. application Ser. No. 08/547,720 filed Oct. 26, 1995 which issued as U.S. Pat. No. 5,757,914.

The present invention relates to systems and methods for restricting the use of executable modules such that each executable module can be dynamically linked only to other executable modules whose authenticity has been verified.

BACKGROUND OF THE INVENTION

In the context of a computer program, an "external function" is typically a procedure or function located in a library or other repository of functions that is external to the computer program using the external function. External functions are often, but not always, authored by different people or by different entities than the computer programs using those external functions.

Program execution environments that allow external functions to be bound at run time, rather than at link time or compile time, facilitate the maintenance and updating of computer programs because for such programs to be used in such execution environments only the computer programs that are being revised or updated need to be recompiled, while the other modules can be left unchanged. Furthermore, the recompilation process is simplified because the compilation of the revised programs can be performed even if other modules used by the program are not present in the program development system.

However, systems using such program execution environments are vulnerable, because the interfaces between the program modules are usually well specified, or can be determined by third parties, and it is possible for such third parties to therefore use those program modules in ways not sanctioned by the corresponding software license agreements. Alternately, such third parties can allow the system to be subverted by replacing authentic program module with corrupted ones.

This problem is magnified when dealing with cryptographic routines in software that is destined for export from the United States of America to customers or distributors in other countries. It is currently forbidden by U.S. trade law to export software modules that provide general cryptographic capabilities. On the other hand, it is allowed to export programs that use cryptographic capabilities in a limited context and that cannot be used to perform general cryptographic functions outside the limited context of the exported program. In fact, it is commercially important to be able to design software systems for export that use cryptographic functions in an authorized manner. Prior art late bound systems, such as dynamic link libraries (DLLs in the Windows system) or shared objects (.so files in Solaris), attempt to solve this problem by either obscuring the interfaces between software modules, or by providing separate "export only" versions of their software. Providing separate "export only" versions of software products leads to problems in keeping the domestic and export versions "synchronized" with respect to upgrades and maintenance revisions with a single code base.

Another example of a situation where there is a need to limit or prevent use of dynamically linkable modules is an application written by a vendor that wishes to keep some functions in the application private for either trade secret or contractual reasons. Such systems require limiting access to these private functions.

SUMMARY OF THE INVENTION

In summary, the present invention is a computer system having a program module verifier and at least first and second program modules. Each of the program modules includes a digital signature and an executable procedure. The first program module furthermore includes a procedure call to the second procedure module, a procedure call to the program module verifier that is logically positioned in the first program module so as to be executed prior to execution of the procedure call to the second program module, and instructions preventing execution of the procedure call to the second program module when the procedure call to the program module verifier results in a verification denial being returned by the program module verifier.

The second program module includes an executable procedure to be performed in response to the procedure call by the first program module to the second program module, a procedure call to the program module verifier that is logically positioned in the second program module so as to be executed prior to completion of execution of the second program module's executable procedure, and instructions preventing completion of execution of that executable procedure when the program module verifier returns a verification denial with respect to the first program module.

The program module verifier responds to procedure calls by verifying the authenticity of any specified program module and by returning a verification confirmation or denial in response to each such procedure call. More specifically, in a preferred embodiment, the program verifier module includes instructions for responding to a procedure call requesting verification of a specified program module by (A) decoding a digital signature in the specified program module with a corresponding decoding key, (B) generating a message digest of at least a portion the specified program module in accordance with a message digest function, (C) returning a verification confirmation when the decoded digital signature matches the message digest, and (D) returning a verification denial when the decoded digital signature does not match the message digest.

In the preferred embodiment, when the program module verifier fails to verify the authenticity of the second program module, the first program module throws an exception and aborts its execution. Similarly, when the program module verifier fails to verify the authenticity of the first program module, the second program module throws an exception and aborts its execution.

BRIEF DESCRIPTION OF THE DRAWINGS

Additional goals and features of the invention will be more readily apparent from the following detailed description and appended claims when taken in conjunction with the drawings, in which:

DESCRIPTION OF THE PREFERRED EMBODIMENT

Figure 1:
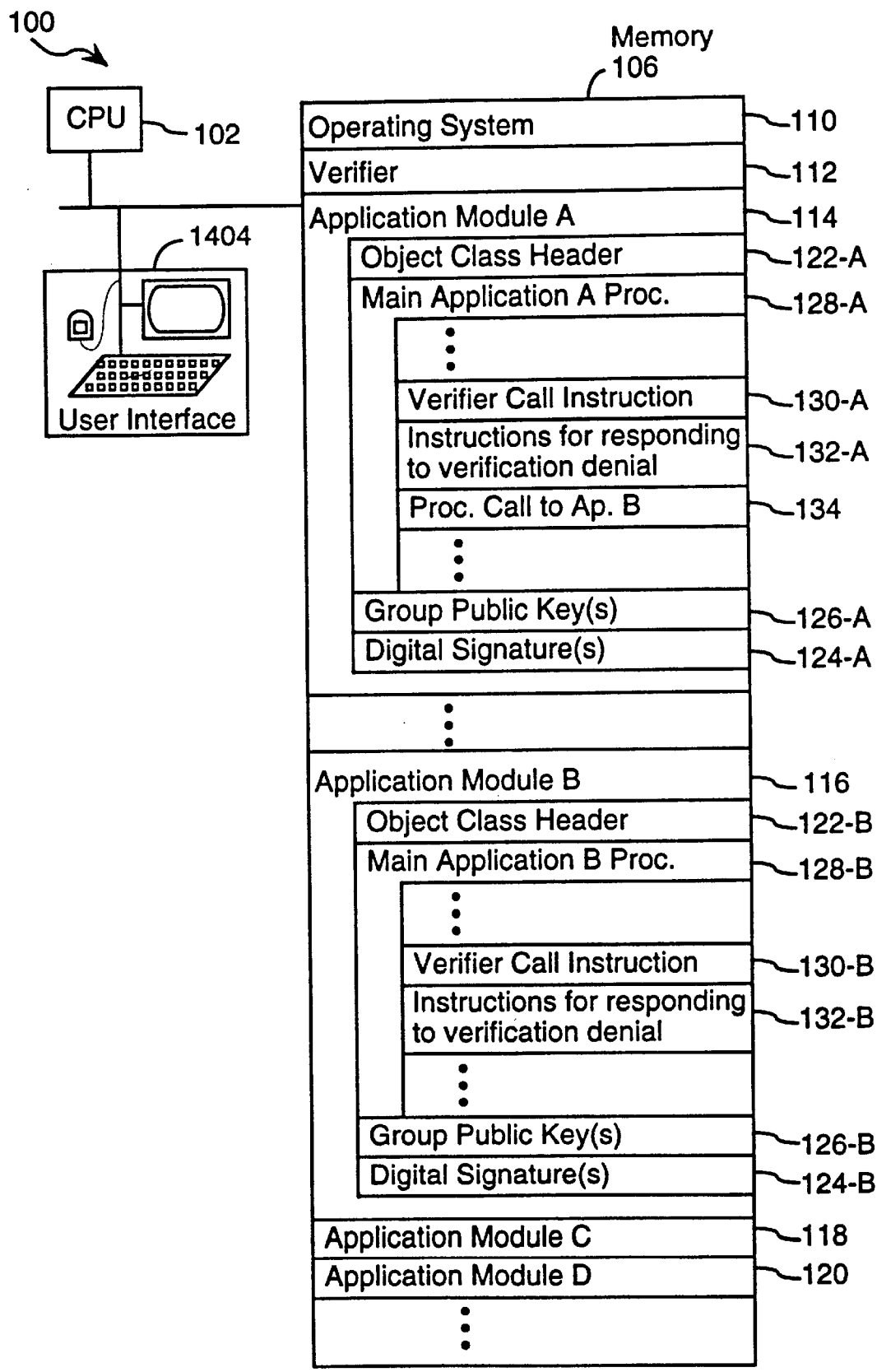
FIG. 1 is a block diagram of a computer system incorporating the present invention.

Referring to FIG. 1, there is shown a computer system 100. While the computer 100 may be a desktop computer, such as a Sun workstation, IBM compatible computer, or Macintosh computer, virtually any type of computer could be used. The computer 100 includes a CPU 102, a user interface 104, and memory 106. Memory 106 includes primary random access memory (RAM) as well as secondary memory, typically one or more magnetic or optical disks. The memory 106 stores an operating system 110, a program module or object authenticity verifier 112, and a set of application program object instances 114, 116, 118, 120, also called program modules or application program modules.

As shown in FIG. 1, in a preferred embodiment of the invention each application program object instance includes an object header 122, at least one digital signature 124, at least one embedded public encryption key 126 and a main application procedure 128 (often called a method). Each method or procedure 128 includes at least one verifier procedure call instruction 130 and instructions 132 for responding to a verification denial message received in response to the verifier procedure call, such as instructions for aborting execution of the procedure. The main application A procedure (128-A) in the first program module furthermore includes a procedure call 134 to an executable procedure (e.g., the main application B procedure 128-B) in the second procedure module. The procedure call 130-A to the program module verifier is logically positioned in the first program module so as to be executed prior to execution of the procedure call 134 to the second program module.

The procedure call 130-B to the program module verifier is logically positioned in the second program module immediately after the entry point to each executable procedure 128-B in the second program module so as to be executed prior to execution of each such procedure 128-B. More generally, in other embodiments of the invention the procedure call 130-B to the program module verifier is logically positioned in the second program module (and more generally, in all program modules that will be called by other program modules) prior to the completion point in each executable procedure in the second program module so as prevent completion of the execution of each such procedure if verification of the calling program is denied by the verifier.

In a preferred embodiment of the present invention all the procedures in a designated group, such as all the procedures used by a particular top level application or a suite of top level applications, have the same embedded public key 126 and all are digitally signed using the same private encryption key, for example using the RSA encryption methodology. However, in an alternate embodiment, different procedures and subgroups of procedures are signed with different private keys. In the alternate embodiment, the procedure modules that include procedure calls have embedded public keys for verification of the procedures that they can call, and all procedure modules that can be called by other procedures include public keys for verification of the calling procedures.

Figure 2:
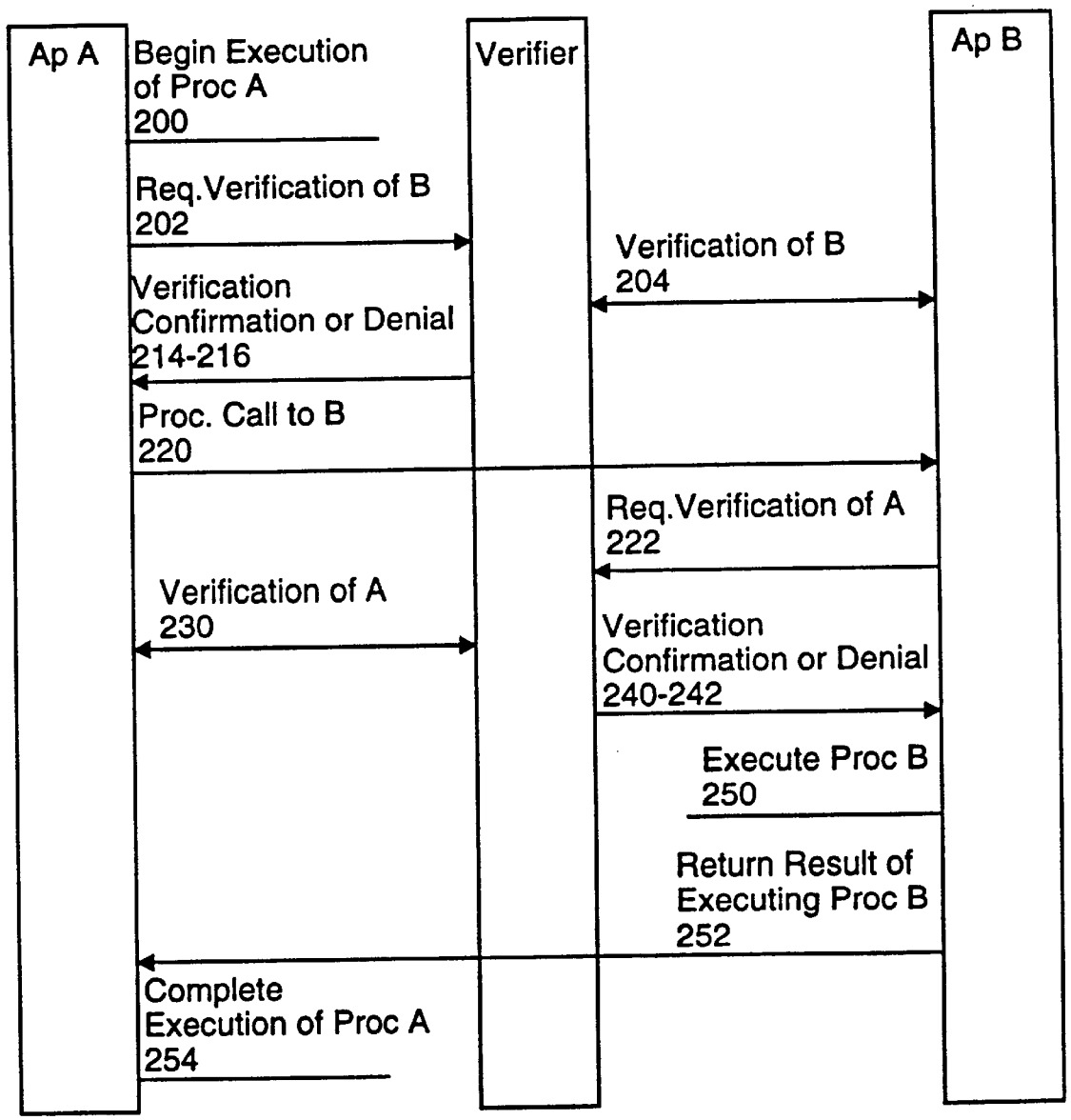
FIG. 2 is a "time line" representation of how a typical procedure call is performed using the preferred embodiment of the present invention.
Figure 3A:
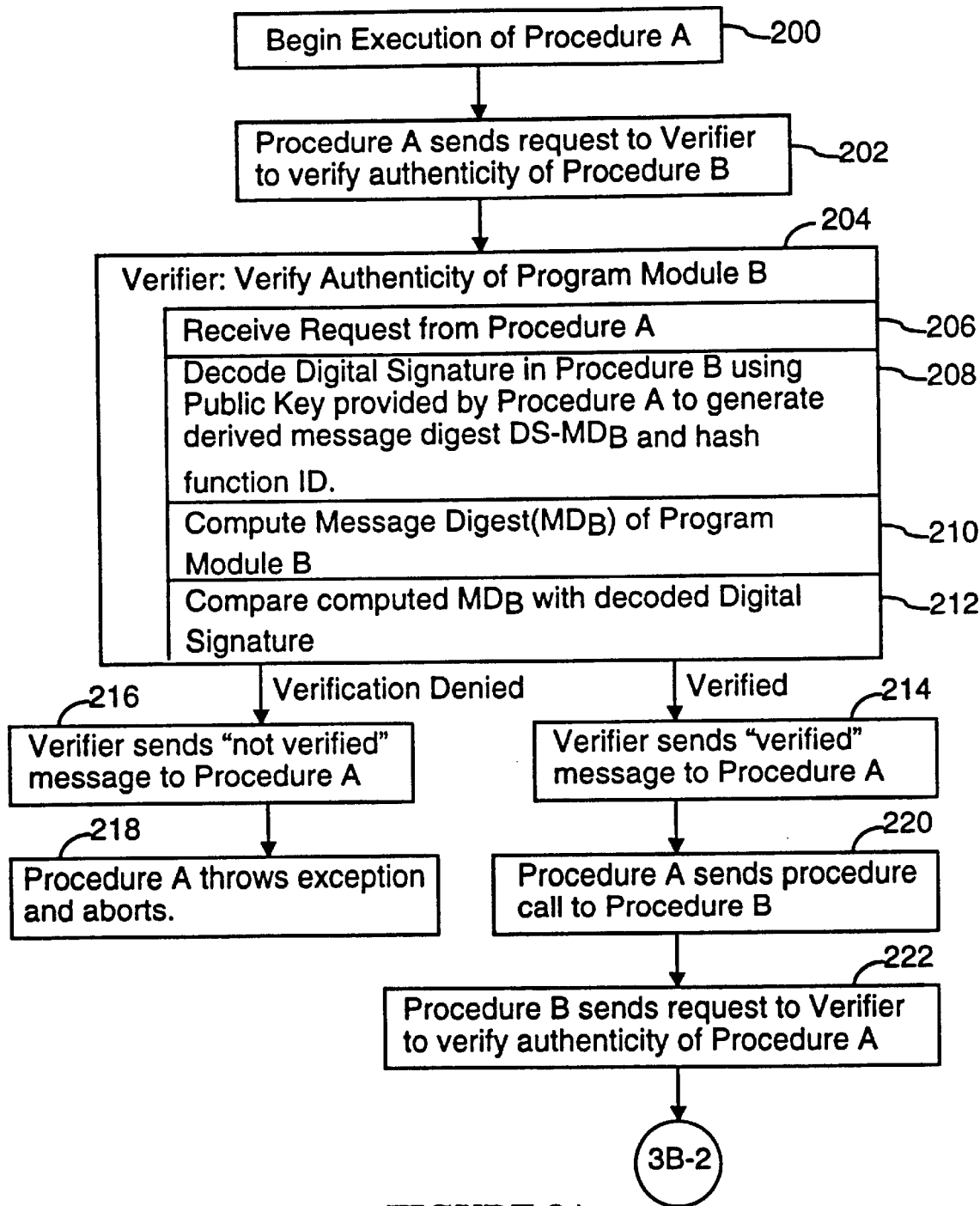
FIG. 3 is a flow chart of the method used in a preferred embodiment for two linked software modules to verify each other's authenticity.

FIG. 2 is a "time line" representation of how a typical procedure call is performed using the preferred embodiment of the present invention. In FIG. 2 earlier events are shown at higher vertical positions than later events. FIG. 3 is a flow chart of the steps involved in the performance of a procedure call.

Referring to FIGS. 2 and 3, an executable procedure (e.g., the "main application A procedure" 128-A in FIG. 1) in program module A begins execution (step 200). For the purposes of this discussion, the procedure in program module A that is being executed will be called "procedure A" and the procedure that it is attempting to call in program module B will be called "procedure B".

Prior to making a procedure call to an executable procedure in program module B (step 220), procedure A makes a procedure call to the verifier to request verification of the authenticity of program module B (step 202). The verifier then attempts to verify the authenticity of program module B and sends a return value to procedure A to indicate whether or not the verification of program module B was successful (step 204).

More specifically, the verifier, which is preferably a distinct trusted object (or alternately a trusted system service procedure) receives the request message from procedure A (step 206), and decodes (step 208) a digital signature embedded in program module B using a public key provided by the calling procedure (i.e., procedure A). The public key provided by calling procedure A to the verifier is the "group" public key 126-A embedded in program module A.

In the preferred embodiment, the digital signature of a program module is generated by computing the message digest of the program module, supplementing the message digest with a hash function identifier to indicate the type of hash function used to generate the message digest, encrypting the resulting value with a private key using the RSA encryption methodology, and then supplementing that encrypted value with a clear text identifier of the source (i.e., author or distributor) of the program module:

$MD_B$=HashFunction(Program Module B)

Digital Signature$_B$=Encrypt($MD_B$+HashFunction ID, PrivateKey)+ ClearText ID of Program Module B's Source Therefore to decode the digital signature of program module B, the verifier (A) removes the clear text ID from the digital signature, and then (B) decodes the remaining portion of the digital signature with the public key to generate a signature based message digest DS-$MD_B$ and a hash function ID.

DS-$MD_B$+HashFunction ID=Decode (Digital Signature$_B$−ClearText ID, PublicKey)

Next, the verifier computes a message digest $MD_B$ of at least a portion of program module B (step 210) using the hash function identified in the decoded digital signature. The hash function used to generate the message digest is typically a function, such as a CRC encoding function, that is known to generate distinct values for distinct program modules with extremely high probability. Many hash functions suitable for generating a message digest are known to those skilled in the art.

The verifier then compares the computed message digest $MD_B$ with the message digest DS-$MD_B$ in the decoded digital signature (step 212) and returns a verification confirmation message to the calling procedure (step 214) if the two message digests match and returns a verification denial message (step 216) if the two message digests do not match.

In one preferred embodiment, there is a single digital signature for each program module, and the associated message digest is computed using a hash function of the entire contents of the program module. In other embodiments, the message digest may be based on only a portion of the program module. For instance, in a second preferred embodiment, each program module has two digital signatures: one for the methods portion of the program module and another for a data portion (if any) of the program module. When a program module has two digital signatures, both of the message digests derived by decoding the two digital signatures must match corresponding message digests computed by the verifier in order for the verifier to return a verification confirmation message. If the message digest in either decoded digital signature does not match the corresponding message digest computed by the verifier, the verifier returns a verification denial message.

If the verifier denies verification of program module B (step 216), procedure A "throws an exception" and then aborts (step 218). Throwing an exception generally causes the associated thread of execution to terminate and furthermore causes an exception handler procedure to be executed by the calling thread of execution so as to give the calling thread of execution the opportunity to analyze and otherwise respond to the failure of the called procedure (i.e., procedure A in this case).

Generally, the verifier will deny verification of a program module only if the program module has been corrupted, such as during installation or transmission from one computer to another, or deliberately tampered with. In normal operation, verification denials should be unusual events.

If the verifier confirms verification of program module B (step 214), procedure A then goes ahead with making a procedure call to procedure B in program module B (step 220). In the preferred embodiment, one of the very first things that procedure B does upon receiving a procedure call is to make a procedure call to the verifier (step 222), sending it a request to verify the authenticity of the calling program module (i.e., program module A in this case).

The verifier then attempts to verify the authenticity of program module A and sends a return value to procedure B to indicate whether or not the verification of program module A was successful (step 230).

More specifically, the verifier receives the request message from procedure B (step 232), and decodes (step 234) a digital signature embedded in program module A using a public key provided by procedure B. The public key provided by procedure B to the verifier is the "group" public key 126-B embedded in program module B.

As explained above, the digital signature of program module A is generated by computing the message digest of program module A, supplementing the message digest with a hash function identifier to indicate the type of hash function used to generate the message digest, encrypting the resulting value with a private key using the RSA encryption methodology, and then supplementing that encrypted value with a clear text identifier of the source (i.e., author or distributor) of the program module:

$MD_A$=HashFunction(Program Module A)

Digital Signature$_A$=Encrypt($MD_A$+HashFunction ID, PrivateKey)+ ClearText ID of Program Module A's Source Therefore to decode the digital signature of program module A, the verifier (A) removes the clear text ID from the digital signature, and then (B) decodes the remaining portion of the digital signature to generate a signature based message digest DS-$MD_A$ and a hash function ID.

DS-$MD_A$+HashFunction ID=Decode (Digital Signature$_A$−ClearText ID, PublicKey)

Next, the verifier computes a message digest $MD_A$ of at least a portion of program module A (step 236) using the hash function identified in the decoded digital signature.

The verifier then compares the computed message digest $MD_A$ with the message digest DS-$MD_A$ in the decoded digital signature (step 238) and returns a verification confirmation message to the calling procedure (step 240) if the two message digests match and returns a verification denial message (step 242) if the two message digests do not match.

If the verifier denies verification of program module A (step 216), procedure B "throws an exception" and then aborts (step 244).

If the verifier confirms verification of program module A (step 240), procedure B is executed to completion (step 250) and the result generated by executing procedure B is returned to procedure A (step 252). Finally, procedure A completes its execution using the results received from procedure B (step 254).

ALTERNATE EMBODIMENTS

In some alternate embodiments only a portion of the program modules in a group of program modules contain "sensitive" algorithms or which otherwise are more important to authenticate than the other program modules. For instance, in a first alternate embodiment the distributor of a set of program modules (herein called the "full set of program modules") might want to ensure that a small number of program modules (herein called the "restricted subset of program modules") in the group are used only with the other program modules in the group, but might want to allow the remaining program modules to be used by the licensee freely, even with program modules outside the group. In this embodiment, only the restricted set of program modules include procedure calls to the verifier module logically located immediately after the entry points of those program modules. These entry point procedure calls to the verifier are used to verify the authenticity of the calling program module, and upon verification that the calling program module is part of the authenticated group, the called program module performs the computation requested by the calling program module.

In a second alternate embodiment, the distributor of a set of program procedures is not concerned with restricting the use of a set of "restricted program modules," and is instead concerned that all calling procedures attempting to use the services of the restricted program modules in fact get the services of authentic versions of the restricted program modules. In this embodiment, all procedures making procedure calls to the restricted program modules include procedure calls to the verifier module logically located immediately prior to the procedure calls to the restricted program modules. These verifier procedure calls are used to verify the authenticity of the restricted program modules. However, in this embodiment the procedures in the restricted program modules do not contain verifier procedure calls to authenticate the calling program modules. Upon verification that the restricted program module to be called is authentic, the calling program module sends its procedure call to the authenticated restricted program module.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A computer data signal residing on a medium, the computer data signal carrying program module data for receipt and storage in a computer system having a program module verifier configured to respond to procedure calls to the program module verifier by verifying authenticity of any specified program module and by returning a verification confirmation or denial in response to each such procedure call;

the program module data carried by the computer data signal comprising:

a first program module; and a second program module;

the first program module including:

a procedure call to the second program module;

a procedure call to the program module verifier for verifying the second program module's authenticity, wherein the procedure call to the program module verifier is logically positioned in the first program module so as to be executed prior to execution of the procedure call to the second program module; and instructions preventing execution of the procedure call to the second program module when the procedure call to the program module verifier results in a verification denial being returned by the program module verifier;

the second program module including:

an executable procedure to be performed in response to the procedure call to the second program module;

a procedure call to the program module verifier for verifying the first program module's authenticity, wherein the procedure call to the program module verifier is logically positioned in the second program module so as to be executed prior to completion of execution of the executable procedure; and instructions preventing completion of execution of the executable procedure when the procedure call to the program module verifier results in a verification denial being returned by the program module verifier.

2. The computer data signal of claim 1, wherein the program verifier module includes instructions for issuing an authenticity verification for any specified program module only when inspection of the specified program module indicates that the specified program module is identical to a corresponding program module known to be authentic, and for otherwise issuing an authenticity verification denial; and the instructions preventing execution of the procedure call include instructions for aborting execution of the first program module when the procedure call to the program module verifier results in a verification denial being returned by the program module verifier.

3. The computer data signal of claim 1, the first program module including a first digital signature and a first executable procedure;

the second program module including a second digital signature and a second executable procedure;

the program verifier module including instructions for responding to a procedure call requesting verification of the second program module by decoding the second digital signature in the second program module with a corresponding decoding key, generating a message digest of at least a portion the second program module in accordance with a predefined message digest function, returning a verification confirmation when the decoded digital signature matches the message digest, and returning a verification denial when the decoded digital signature does not match the message digest.

4. A computer data signal residing on a medium, the computer data signal carrying program module data for receipt and storage in a computer system having a program module verifier configured to verify authenticity of any specified program module and to return to a requesting program module a verification signal, comprising a verification confirmation or verification denial, respectively confirming or denying authenticity of the specified program module;

the program module data carried by the computer data signal comprising:

a first program module; and a second program module;

the first program module including:

first instructions for receiving from the program module verifier the verification signal with respect to the second program module, and second instructions for preventing execution of third instructions in the first program module when the received verification signal comprises a verification denial; and the second program module including:

fourth instructions for receiving from the program module verifier the verification signal with respect to the first program module, and fifth instructions for preventing execution of sixth instructions in the second program module when the received verification signal comprises a verification denial.

5. The computer data signal of claim 4, wherein the program verifier module includes instructions for issuing a verification signal comprising a verification confirmation with respect to any specified program module only when inspection of the specified program module indicates that the specified program module is identical to a corresponding program module known to be authentic, and for otherwise issuing a verification signal comprising a verification denial; and the second instructions of the first program module prevent execution of a procedure call to the second procedure when the received verification signal comprises a verification denial.

6. The computer data signal of claim 4, wherein the program verifier module includes instructions for issuing a verification signal comprising a verification confirmation with respect to any specified program module only when inspection of the specified program module indicates that the specified program module is identical to a corresponding program module known to be authentic, and for otherwise issuing a verification signal comprising a verification denial; and the second instructions of the first program module abort execution of the first program module when the received verification signal comprises a verification denial.

7. The computer data signal of claim 4, wherein the first program module includes a first digital signature and a first executable procedure;

the second program module includes a second digital signature and a second executable procedure;

the program verifier module includes instructions for responding to a procedure call requesting verification of the second program module by decoding the second digital signature in the second program module with a corresponding decoding key, generating a message digest of at least a portion of the second program module in accordance with a predefined message digest function, returning a verification signal comprising a verification confirmation when the decoded digital signature matches the message digest, and returning a verification signal comprising a verification denial when the decoded digital signature does not match the message digest.

8. A computer data signal residing on a medium, the computer data signal carrying program module data for receipt and storage in a computer system, the program module data carried by the computer data signal comprising:

a program module verifier configured to verify authenticity of any specified program module and to return to a requesting program module a verification signal, comprising a verification confirmation or verification denial, respectively confirming or denying authenticity of the specified program module;

a first program module; and a second program module;

the first program module including:
first instructions for receiving from the program module verifier the verification signal with respect to the second program module, and second instructions for preventing execution of third instructions in the first program module when the received verification signal comprises a verification denial; and the second program module including:
fourth instructions for receiving from the program module verifier the verification signal with respect to the first program module, and fifth instructions for preventing execution of sixth instructions in the second program module when the received verification signal comprises a verification denial.

9. The computer data signal of claim 8, wherein the program verifier module includes instructions for issuing a verification signal comprising a verification confirmation with respect to any specified program module only when inspection of the specified program module indicates that the specified program module is identical to a corresponding program module known to be authentic, and for otherwise issuing a verification signal comprising a verification denial; and the second instructions of the first program module prevent execution of a procedure call to the second procedure when the received verification signal comprises a verification denial.

10. The computer data signal of claim 8, wherein the program verifier module includes instructions for issuing a verification signal comprising a verification confirmation with respect to any specified program module only when inspection of the specified program module indicates that the specified program module is identical to a corresponding program module known to be authentic, and for otherwise issuing a verification signal comprising a verification denial; and the second instructions of the first program module abort execution of the first program module when the received verification signal comprises a verification denial.

11. The computer data signal of claim 8, wherein the first program module includes a first digital signature and a first executable procedure;

the second program module includes a second digital signature and a second executable procedure;

the program verifier module includes instructions for responding to a procedure call requesting verification of the second program module by decoding the second digital signature in the second program module with a corresponding decoding key, generating a message digest of at least a portion of the second program module in accordance with a predefined message digest function, returning a verification signal comprising a verification confirmation when the decoded digital signature matches the message digest, and returning a verification signal comprising a verification denial when the decoded digital signature does not match the message digest.

12. A computer program product comprising a computer readable storage medium and a computer program mechanism embedded therein, the computer program mechanism comprising:

a program module verifier configured to verify authenticity of any specified program module and to return to a requesting program module a verification signal, comprising a verification confirmation or verification denial, respectively confirming or denying authenticity of the specified program module;

a first program module; and a second program module;

the first program module including:
first instructions for receiving from the program module verifier the verification signal with respect to the second program module, and second instructions for preventing execution of third instructions in the first program module when the received verification signal comprises a verification denial; and the second program module including:
fourth instructions for receiving from the program module verifier the verification signal with respect to the first program module, and fifth instructions for preventing execution of sixth instructions in the second program module when the received verification signal comprises a verification denial.

13. The computer program product of claim 12, wherein the program verifier module includes instructions for issuing a verification signal comprising a verification confirmation with respect to any specified program module only when inspection of the specified program module indicates that the specified program module is identical to a corresponding program module known to be authentic, and for otherwise issuing a verification signal comprising a verification denial; and the second instructions of the first program module prevent execution of a procedure call to the second procedure when the received verification signal comprises a verification denial.

14. The computer program product of claim 12, wherein the program verifier module includes instructions for issuing a verification signal comprising a verification confirmation with respect to any specified program module only when inspection of the specified program module indicates that the specified program module is identical to a corresponding program module known to be authentic, and for otherwise issuing a verification signal comprising a verification denial; and the second instructions of the first program module abort execution of the first program module when the received verification signal comprises a verification denial.

15. The computer program product of claim 12, wherein the first program module includes a first digital signature and a first executable procedure;

the second program module includes a second digital signature and a second executable procedure;

the program verifier module includes instructions for responding to a procedure call requesting verification of the second program module by decoding the second digital signature in the second program module with a corresponding decoding key, generating a message digest of at least a portion of the second program module in accordance with a predefined message digest function, returning a verification signal comprising a verification confirmation when the decoded digital signature matches the message digest, and returning a verification signal comprising a verification denial when the decoded digital signature does not match the message digest.

16. A computer program product for use in conjunction with a computer system having a program module verifier configured to verify authenticity of any specified program module and to return to a requesting program module a verification signal, comprising a verification confirmation or verification denial, respectively confirming or denying authenticity of the specified program module;

the computer program product comprising a computer readable storage medium and a computer program mechanism embedded therein, the computer program mechanism comprising:

a first program module; and a second program module;

the first program module including:

first instructions for receiving from the program module verifier the verification signal with respect to the second program module, and second instructions for preventing execution of third instructions in the first program module when the received verification signal comprises a verification denial; and the second program module including:

fourth instructions for receiving from the program module verifier the verification signal with respect to the first program module, and fifth instructions for preventing execution of sixth instructions in the second program module when the received verification signal comprises a verification denial.

17. The computer program product of claim 16, wherein the program verifier module includes instructions for issuing a verification signal comprising a verification confirmation with respect to any specified program module only when inspection of the specified program module indicates that the specified program module is identical to a corresponding program module known to be authentic, and for otherwise issuing a verification signal comprising a verification denial; and the second instructions of the first program module prevent execution of a procedure call to the second procedure when the received verification signal comprises a verification denial.

18. The computer program product of claim 16, wherein the program verifier module includes instructions for issuing a verification signal comprising a verification confirmation with respect to any specified program module only when inspection of the specified program module indicates that the specified program module is identical to a corresponding program module known to be authentic, and for otherwise issuing a verification signal comprising a verification denial; and the second instructions of the first program module abort execution of the first program module when the received verification signal comprises a verification denial.

19. The computer program product of claim 16, wherein the first program module includes a first digital signature and a first executable procedure;

the second program module includes a second digital signature and a second executable procedure;

the program verifier module includes instructions for responding to a procedure call requesting verification of the second program module by decoding the second digital signature in the second program module with a corresponding decoding key, generating a message digest of at least a portion of the second program module in accordance with a predefined message digest function, returning a verification signal comprising a verification confirmation when the decoded digital signature matches the message digest, and returning a verification signal comprising a verification denial when the decoded digital signature does not match the message digest.

* * * * *